United States Patent
San Andres et al.

(10) Patent No.: US 9,250,674 B2
(45) Date of Patent: Feb. 2, 2016

(54) METHODS AND SYSTEMS FOR RESTORING POWER BASED ON FORECASTED LOADS

(71) Applicant: General Electric Company, Schenectady, NY (US)

(72) Inventors: Ramon Juan San Andres, Duluth, GA (US); Atul Nigam, Johns Creeks, GA (US); Kamal Kumar Arvind, Atlanta, GA (US); Mary Elizabeth Bain, Woodstock, GA (US)

(73) Assignee: General Electric Company, Schenectady, NY (US)

( * ) Notice: Subject to any disclaimer, the term of this patent is extended or adjusted under 35 U.S.C. 154(b) by 388 days.

(21) Appl. No.: 13/745,000

(22) Filed: Jan. 18, 2013

(65) Prior Publication Data

US 2014/0207301 A1  Jul. 24, 2014

(51) Int. Cl.
*G05D 3/12* (2006.01)
*G06F 1/30* (2006.01)
*H02J 3/00* (2006.01)

(52) U.S. Cl.
CPC . *G06F 1/30* (2013.01); *H02J 3/006* (2013.01); *H02J 2003/003* (2013.01); *Y02B 70/3225* (2013.01); *Y02E 60/725* (2013.01); *Y04S 10/20* (2013.01); *Y04S 10/525* (2013.01); *Y04S 20/222* (2013.01)

(58) Field of Classification Search
CPC ........... H02H 7/26; H02H 3/06; H02H 3/334; Y04S 10/525; Y04S 40/12; Y04S 10/522; Y04S 10/54; H02J 3/14; H02J 3/28; H02J 2003/001; H02J 2003/003; Y02B 60/1282; G05B 13/02; G05B 19/02; G05B 15/02; G05B 11/00; G05B 13/048

USPC ........................ 700/286, 291, 295, 297, 300
See application file for complete search history.

(56) References Cited

U.S. PATENT DOCUMENTS

| | | | |
|---|---|---|---|
| 6,061,609 A | 5/2000 | Kanoi et al. | |
| 6,172,432 B1 * | 1/2001 | Schnackenberg et al. | 307/23 |
| 6,453,265 B1 | 9/2002 | Dekhil et al. | |
| 6,841,275 B2 | 1/2005 | Pearson | |
| 7,313,465 B1 | 12/2007 | O'Donnell | |
| 7,751,166 B2 * | 7/2010 | Stoupis et al. | 361/64 |
| 7,844,568 B2 * | 11/2010 | Fein et al. | 706/62 |
| 7,979,222 B2 * | 7/2011 | Donde et al. | 702/61 |
| 7,979,239 B2 | 7/2011 | Trias | |
| 8,000,913 B2 | 8/2011 | Kreiss et al. | |
| 8,068,938 B2 | 11/2011 | Fujita | |
| 2003/0115000 A1 * | 6/2003 | Bodas | 702/60 |
| 2006/0238364 A1 * | 10/2006 | Keefe et al. | 340/646 |

(Continued)

OTHER PUBLICATIONS

European Search Report and Written Opinion issued in connection with corresponding EP Application No. 14151137.8-1806 on Oct. 16, 2014.

*Primary Examiner* — Darrin Dunn
(74) *Attorney, Agent, or Firm* — Armstrong Teasdale LLP

(57) ABSTRACT

A method for restoring power based on forecasted loads is described. The method includes identifying at least one zone within a power distribution network and predicting an energy demand of the at least one zone. The method also includes identifying at least one alternate source of power for the at least one zone, identifying at least one switch within the power distribution network capable of supplying power from the at least one alternate source to the at least one zone, and generating a restoration plan for restoring power to the at least one zone.

20 Claims, 3 Drawing Sheets

(56) References Cited

U.S. PATENT DOCUMENTS

| | | | |
|---|---|---|---|
| 2009/0094097 A1 | 4/2009 | Gardenswartz | |
| 2009/0132302 A1* | 5/2009 | Beekhuis | 705/7 |
| 2009/0187284 A1* | 7/2009 | Kreiss et al. | 700/291 |
| 2010/0094573 A1 | 4/2010 | Yang et al. | |
| 2010/0161151 A1* | 6/2010 | Yang et al. | 700/297 |
| 2011/0029148 A1* | 2/2011 | Yang et al. | 700/297 |
| 2012/0065792 A1* | 3/2012 | Yonezawa et al. | 700/291 |
| 2012/0232713 A1* | 9/2012 | Wang et al. | 700/295 |
| 2012/0265502 A1 | 10/2012 | Omitaomu et al. | |
| 2012/0296711 A1* | 11/2012 | Huffman | 705/14.1 |
| 2013/0041519 A1* | 2/2013 | Feldstein | 700/297 |
| 2015/0046221 A1* | 2/2015 | Narayan et al. | 705/7.31 |

* cited by examiner

METHODS AND SYSTEMS FOR RESTORING POWER BASED ON FORECASTED LOADS

BACKGROUND OF THE INVENTION

The field of the present disclosure relates generally to the generation and delivery of electricity and more specifically, to methods and systems for restoring power based on forecasted loads.

Known power distribution networks include fault detection, isolation, and recovery (FDIR) systems that are used to isolate faults and to restore power following a fault or other power failure. Known systems generate restoration plans based on current load information. However, such plans are generally limited as loads may change within short periods of time. As loads change, for example, further network reconfigurations are required to accommodate the changing loads.

In addition, depending on pre-fault network topology, more than one alternative path, or back-feeding pathway, may be identified from which power can flow from an alternative power source, through a series of switches, to one or more disconnected loads. Accordingly, a system for restoring power is needed that identifies back-feeding pathways that will reduce the risk of cascading power failure and the need for additional network reconfigurations as a result of restoring power.

BRIEF DESCRIPTION OF THE INVENTION

In one embodiment, a system for restoring power to a power distribution network is provided. The system includes a forecast system configured to generate forecast information about the power distribution network and a fault detection, isolation, and recovery (FDIR) system coupled to the power distribution network. The FDIR system is configured to generate fault information about at least one zone in the power distribution network from said FDIR system, receive forecast information from said forecast system, identify at least one alternate source of power for the at least one zone, and generate a restoration plan based on the fault information and the forecast information.

In another embodiment, a fault detection, isolation, and recovery (FDIR) system for use with a power restoration system coupled to a power distribution network is provided. The FDIR system is configured to generate fault information about at least one zone in the power distribution network, receive forecast information about the power distribution system, identify at least one alternate source of power for the at least one, and generate a restoration plan based on the fault information and the forecast information.

In yet another embodiment, a method for restoring power to a power distribution network is provided. The method includes identifying at least one zone within the power distribution network, predicting a first energy demand of the at least one zone, identifying at least one alternate source of power for the at least one zone, identifying at least one switch within the power distribution network capable of supplying power from the at least one alternate source to the at least one zone, and generating a restoration plan for restoring power to the at least one zone.

DETAILED DESCRIPTION OF THE INVENTION

The embodiments described herein include an exemplary power restoration system for use with a power distribution network. The embodiments described herein facilitate the management of power restoration of de-energized portions of the network based on forecasted energy loads.

Technical effects of the embodiments described herein include at least (a) identifying at least one zone within a power distribution network; (b) predicting an energy demand of the at least one zone; (c) identifying at least one alternate source of power for the at least one zone; (d) identifying at least one switch within the power distribution network capable of supplying power from the at least one alternate source to the at least one zone; and (e) generating a restoration plan for restoring power to the at least one zone.

Figure 1:
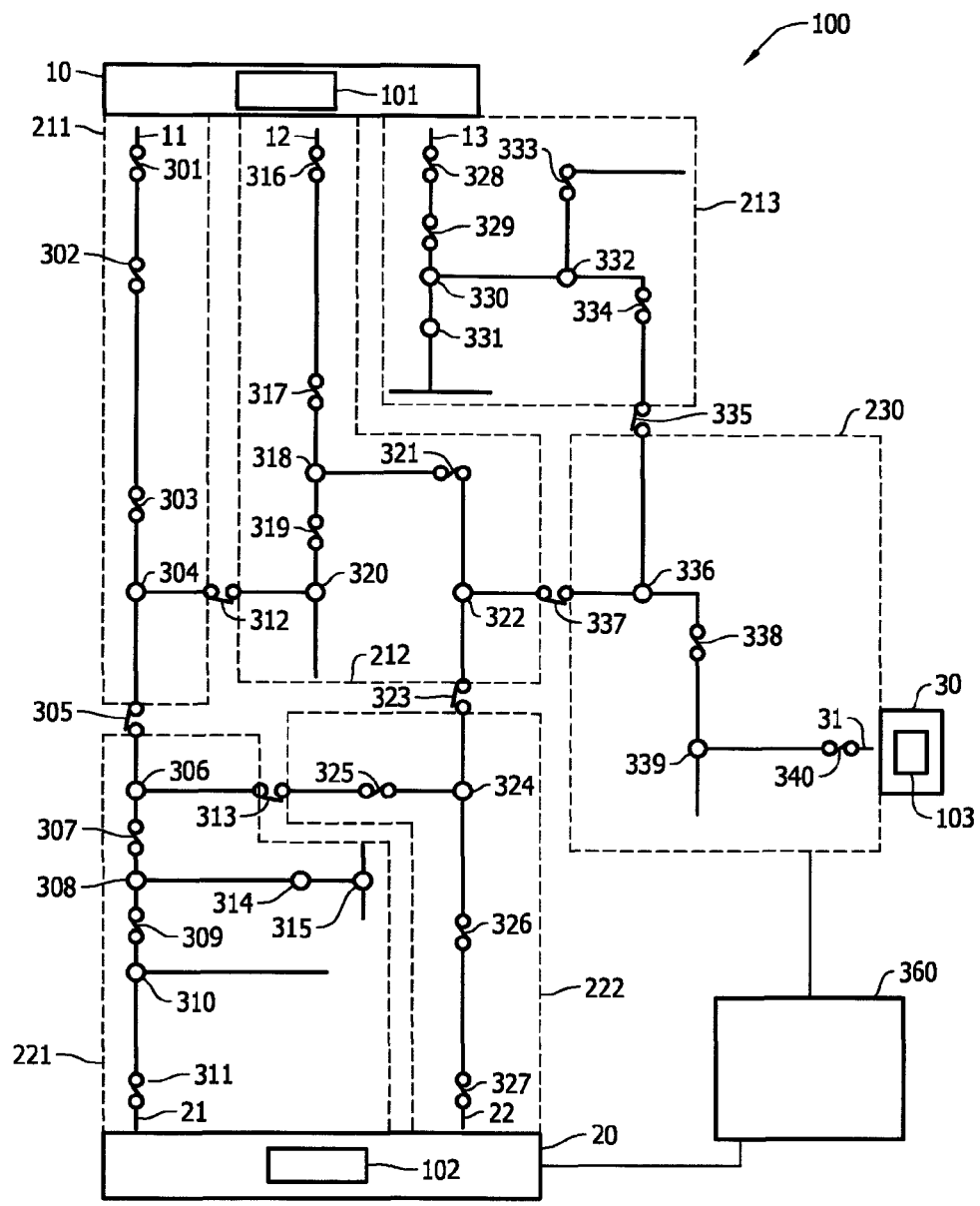
FIG. 1 is a block diagram of an exemplary power distribution network.

With initial reference to FIG. 1, an exemplary power distribution network is generally indicated at 100. The power distribution network 100 includes a plurality of substations 10, 20 and 30, each of which is associated with one or more feeders, shown as 11, 12, 13, 21, 22 and 31. An example of a substation includes a distribution substation configured to transfer power from one or more transmission systems (e.g., a high-voltage transmission line or network) to one or more zones of network 100. Each substation 10, 20 and 30 includes one or more power sources or feeders 11, 12, 13, 21, 22 and 31. Each substation 10, 20, 30 may also include one or more circuit breakers, i.e. substation circuit breakers (or simply "breakers"), 301, 311, 316, 327, 328, and 340, each of which is connected to one of feeders 11, 12, 13, 21, 22 and 31. For the benefit of this text, substation breakers may also be described as "roots". As used herein, the term "feeder" refers to a power distribution line or other conductor that provides power to one or more portions of the network 100. In the exemplary embodiment shown in FIG. 1, substation 10 is associated with feeders 11, 12 and 13, each of which are connected to breakers 301, 316, and 328, respectively. Substation 20 is associated with feeders 21 and 22, each of which are connected to breakers 311 and 327 respectively. Substation 30 is associated with feeder 31, which is connected to breaker 340. Although only three substations are depicted in this example, the network 100 may include any number of substations, each of which may include any number of feeders.

In the exemplary embodiment, network 100 includes a computer system 360 configured to control energy transmission. Although computer system 360 is illustrated as being included within network 100, computer system 360 may be external to network 100 (e.g., remotely located) and in communication with network 100. Furthermore, although described as a computer system, computer system 360 may be any suitable processing device that enables network 100 to function as described herein. For example, computer system 360 may comprise a plurality of processing devices configured to operate together.

In one embodiment, power distribution network 100 is part of a hierarchical transmission and distribution network. A transmission network is located at a high-level hierarchy and supplies power to distribution network 100. Substations 10, 20, 30 are located at a mid-level hierarchy and are connected to a plurality of field devices located at a low-level hierarchy of the transmission and distribution network. In one embodiment, the controllers are located at a hierarchy level that is at least the level of the substations, i.e., the mid-level hierarchy, which is higher than lower hierarchy levels including "in field" locations.

Network 100 includes a plurality of nodes 301-340 located, for example, at a low-level hierarchy, each of which effect the topology of network 100 and connect portions of one or more feeders. The term "node" relates to any addressable point on network 100. Nodes 301-340 may include any type of field device such as a circuit split, a sensor or other measurement point, and/or a controllable switch, such as a circuit breaker, recloser, or sectionalizer. In one embodiment, the nodes include "non-intelligent" field devices, such as devices that do not include local controllers. The field devices may be field-installed devices, for example. The controllable switches may be either normally-closed or normally-open. Nodes 301-340 may be characterized as active or passive. "Active nodes" refers to any nodes that can be controlled to effect a topology change. Active nodes include reclosers, circuit breakers and controllable switches (including, for example, remote-controllable switches) which do not need to have any automation functions related to sectionalizing and restoration. Moreover, active nodes may be capable of three-phase or individual phase control. "Passive nodes" refers to nodes including network splits or any non-controllable items, and do not cause a topology change. Passive nodes may be accounted for because of consideration of load capacities due to re-routing possibilities within the network zone. Nodes may also define various branches, in which the circuit formed in the network splits into multiple additional circuits. A branch may occur as a single or multiple phase branch. The node where the split occurs, located toward the associated substation breaker, may be described as a "branch root".

Network 100 defines an associated "layout" or "topology", which refers to the distribution of the connections of the network, including static and geographical distributions, as well as the number, type, and distribution of nodes in network 100. Network 100 may also be divided into one or more "segments", which refer to single nodes, groups of connected nodes, and/or portions of the feeder located between significant active or passive network nodes. Depending on the layout, segments may be capable of accepting power from multiple feeders across multiple substations. Each segment may have an associated configured "load capacity", which represents the maximum load that can be handled by the segment.

Referring again to FIG. 1, in the present exemplary embodiment, nodes 301-340 include passive network nodes, normally-closed switches, normally-open switches, and sensors. There is no pre-configured limit to the number of nodes. Nodes 302, 303, 307, 309, 317, 319, 321, 325, 326, 329, 333, 334, and 338 are normally-closed switches, which may be opened, for example, to isolate a faulted segment. Nodes 305, 312, 313, 323, 335, and 337 are normally-opened switches, which act to prevent cross power transmission and to define the zones of network 100. Nodes 304, 306, 308, 310, 315, 318, 320, 322, 324, 330, 332, 336, and 339 are passive network nodes, and nodes 314 and 331 are sensors. The layout of network 100, and the particular configuration of types and numbers of nodes shown in the present embodiment are merely exemplary. The system and methods described herein are applicable to any power distribution network having any desired topology, and any number, type and configuration of nodes.

Network 100 also includes a plurality of zones, each of which may be supplied by an individual feeder, and each of which has an associated layout or topology. The term "zone" relates to a distribution sub-network associated with a finite number of active nodes, such as breakers, switches, and reclosers. Zones may also be referred to as "power areas" or "sectors." A segment may be the same as a zone. The topology of a zone refers to the numbers, types, and relative positions of nodes connected to, or in communication with, a controller and/or the controller's power supply. Each zone may be associated with an individual feeder or with multiple feeders. In one embodiment, each zone includes all of the segments between a single breaker in a substation connected to a single feeder and all normally-open switches. The "edge" of a zone refers to the breakers in a substation and the normally-open switches. In the exemplary embodiment of FIG. 1, network 100 includes six zones 211, 212, 213, 221, 222, and 230, and each is associated with an individual feeder and bounded by a substation breaker and at least one normally-open switch. Nodes, such as normally-open switches, that define the edge of a zone and connect adjacent zones together may be referred to as "edge nodes." The zones shown in FIG. 1 are merely exemplary, and it should be appreciated that additional zones may be defined within network 100 that include some or all of zones 211, 212, 213, 221, 222, and 230. More particularly, as a result of a fault within network 100, the topology of network 100 may be adjusted to redefine zones within network 100, as will be described in more detail herein.

The relative position of various nodes, substations, or other components in network 100 are described in relation to one another, and may be described in relation to their position on a network path in relation to other nodes, breakers, feeders, or substations. For example, a first node described as being "before" or "previous" to a second node, "preceding" the second node, and/or "upstream" from the second node, indicates that the first node is located before the second node when parsing the circuit path from the breaker toward an edge of the zone, i.e., the first node is between the breaker or substation and the second node. Likewise, a first node described as being "the next node", "after", or "following" a second node, or "downstream" from the second node, indicates that the first node follows the second node when parsing the circuit path from the breaker toward an edge of the zone, i.e., the first node is between the second node and a zone edge node.

Each substation 10, 20, and 30 includes a respective controller 101, 102, and 103, located at, for example, a mid-level hierarchy, to control various network nodes. Each controller 101, 102, and 103 is communicatively coupled with computer system 360. As shown in FIG. 1, controller 101 is included in substation 10, controller 102 is included in substation 20, and controller 103 is included in substation 30. In one embodiment, each controller 101, 102, and 103 is a Distribution Automation (DA) controller. In the present embodiment, each substation includes one controller. However, a substation may include more than one controller if desired. Each controller 101, 102, and 103 may also serve as a Supervisor Control and Data Acquisition (SCADA) remote terminal unit (RTU) as needed. Each controller 101, 102, and 103 communicates in a pre-configured and, in one embodiment, not dynamically changeable, client-server (master-slave) relationship with the active nodes and sensors located on power segments energized from a respective substation. Each controller 101, 102, and 103 is capable of automatically discovering the other controllers, without pre-configured settings, and establishing ad-hoc exchanges of data. In one embodiment, communication between controllers and nodes is accomplished by way of IP based services.

Each controller 101, 102, and 103 controls at least one zone connected to a feeder or other power source. In one embodiment, a zone is defined by its respective feeder and/or breaker and may further be defined by one or more respective open switches. In the example shown in FIG. 1, network 100 is divided into zones 211, 212, 213, 221, 222, and 230. Zone 211 has edges defined by breaker 301 and normally-open switches 305 and 312, zone 212 has edges defined by breaker 316 and normally-open switches 312, 323, and 337, and zone 213 has edges defined by breaker 328 and normally-open switch 335. Zones 211, 212, and 213 are controlled by controller 101. Zone 221 has edges defined by breaker 311 and normally-open switches 305 and 313, and zone 222 has edges defined by breaker 327 and normally-open switches 313 and 323. Zones 221 and 222 are controlled by controller 102. Zone 230 has edges defined by breaker 340 and normally-open switches 335 and 337, and is controlled by controller 103.

Figure 2:
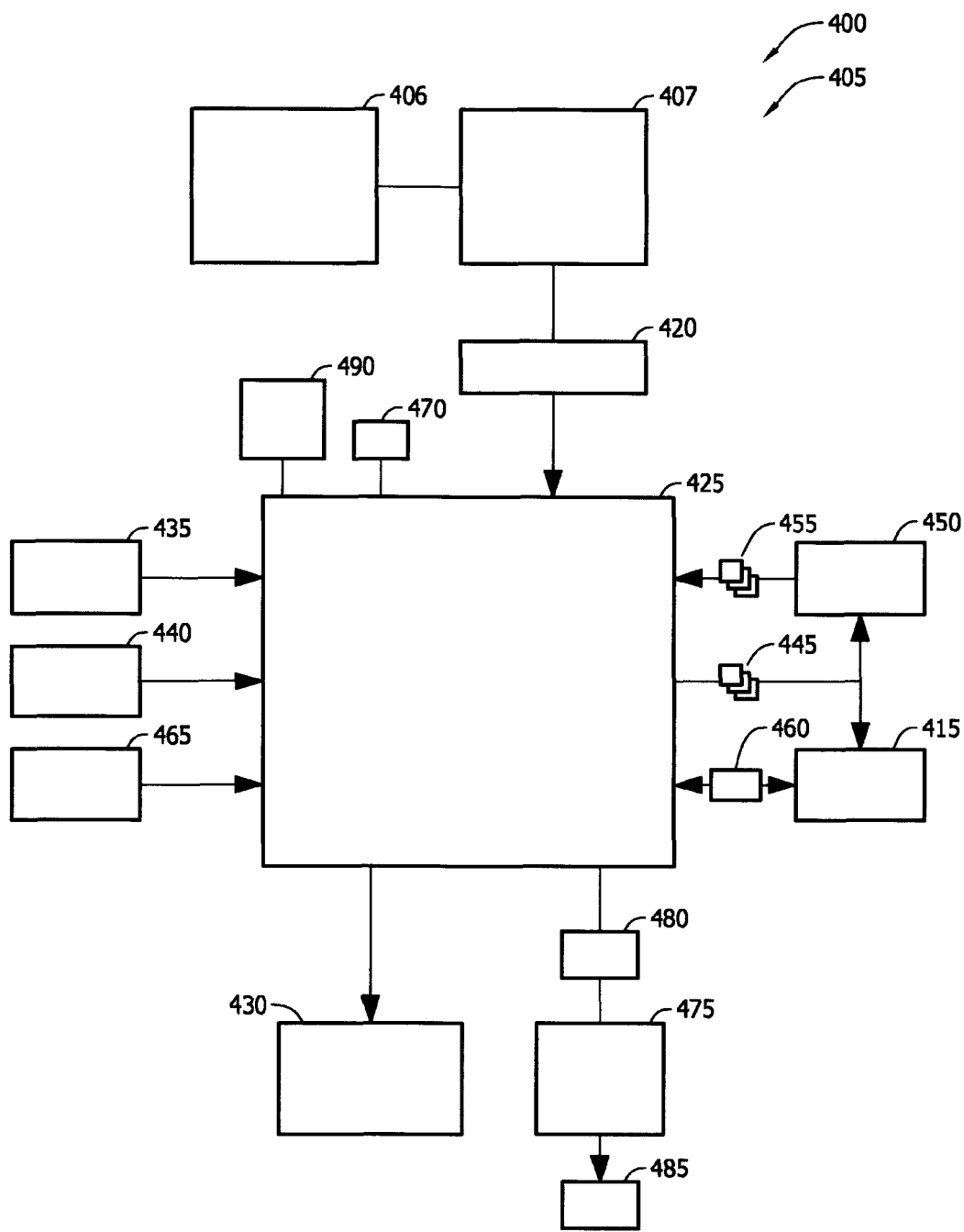
FIG. 2 is a block diagram of an exemplary forecast-based power restoration system that may be used with the network of FIG. 1.

FIG. 2 is a block diagram of an exemplary forecast-based power restoration system 400 that may be used with network 100. Power restoration system 400 includes a fault detection, isolation, and recovery (FDIR) system 405, and a forecasting system 415. In the exemplary embodiment, FDIR system 405 is computer system 360. Alternatively, computer system 360 includes one or more of FDIR system 405 and forecasting system 415. For example, systems 405 and 415 may each be implemented on computer system 360 using one or more processing device.

In the exemplary embodiment, FDIR system 405 includes a fault detection engine 406 and a fault isolation engine 407 that is coupled to fault detection engine 406. Fault isolation engine 407 generates fault isolation information 420 that contains information about a de-energized zone within network 100, e.g., from fault detection engine 406, such as the switches used to isolate the de-energized zone. "De-energized zone" refers to a zone or portion of network 100 where energy demand exceeds energy supply, including, but not limited to, a zone in a black- or brown-out condition, a fault condition, and/or any abnormal operating condition. "De-energized zone" does not necessarily refer to one or more of the zones shown in FIG. 1. Rather, a de-energized zone may be any portion of network 100 capable of being defined by nodes and/or edges. FDIR system 405 includes a restoration engine 425 that analyzes de-energized zones on network 100 to generate a restoration plan 430 for each de-energized zone. Using fault isolation information 420 from fault isolation engine 407 in combination with network topology information 435 and real-time network measurements 440, restoration engine 425 analyzes de-energized zones 445.

In the exemplary embodiment, restoration engine 425 receives, as input, network topology information 435 that represents the topology of network 100 from network 100. Alternatively, FDIR system 405 includes a pre-determined topological representation of network 100. Topology information 435 includes definitions of each zone including connections between and among the zones of network 100. Topology information 435 may be represented as a graph including zones and/or switches as nodes and connections between zones as edges. Real-time network measurements 440 may include data from controllers 101, 102, 103, and/or sensors 314, 331, such as current loads.

Restoration engine 425 transmits the identities of de-energized zones 445 to an alternate source engine 450 and forecasting system 415. In the exemplary embodiment, alternate source engine 450 is implemented using computer system 360. Alternatively, source engine 450 may be implemented on an independent computer system and/or with forecasting system 415. Source engine 450 analyzes each de-energized zone 445 to determine at least one alternative source of power 455, such as a zone adjacent to zone 445, as an alternative to the currently unavailable source of power for each de-energized zone 445. Each alternate source 455 is identified by the switch or switches, and the amount of power available through that switch, that must be closed to enable power to flow from alternate source 455 to de-energized zone 445. Alternate sources 455 may include, for example, zones 211, 212, 213, 221, 222, and 230.

Forecasting system 415 predicts loads for each de-energized zone 445 and/or each alternate source 455. Forecasting system 415 transmits forecasted load information 460 that includes projected loads or demand to restoration engine 425. Forecasted load information 460 may be based on historical usage, pre-determined scheduled usage (e.g., conventions and/or sporting events), weather forecasts, and the like. Moreover, forecasted load information 460 may be based on a pre-determined time interval, such as a few hours, a few days, and/or an estimated time until de-energized zone 445 is restored to a normal operating state.

Restoration engine 425 analyzes forecasted load information 460 from forecasting system 415 in combination with restoration criteria 465 that are inputted to FDIR system 405 to generate a power restoration plan 430 for each de-energized zone 445. Alternatively, one or more plans 430 may be generated for each de-energized zone 445. Power restoration plan 430 includes the switches to be modified, and the sequential order in which to modify the switches. Restoration criteria 465 may be input to FDIR system 405 using at least one human interface device 470 or using a remote system (not shown) connected to FDIR system 405 using a network (not shown). Human interface device 470, may be, for example, a keyboard, mouse, touchscreen or any other human interface device that enables FDIR system 405 to function as described herein. Restoration criteria 465 may include, but are not limited to, a number of customers to have power restored, relative importance of customers, and/or requirements for the number of switching steps required, etc.

In the exemplary embodiment, power restoration system 400 includes a demand response generation system 475. Demand response generation system 475 communicates with one or more customer sites (not shown) coupled to network 100 for shedding loads within a zone, e.g., de-energized zones 445 and/or alternate sources 455. More particularly, restoration engine 425 may transmit a shedding request 480 that is based on power restoration plan 430 to demand response generation system 475. Demand response generation system 475 determines, based on shedding request 480, which customer sites will receive a customer shedding request 485. For example, shedding request 480 may specify one or more customer sites or may specify target loads for zones 445 or sources 455. Customer shedding request 485 is transmitted to a customer demand response system (not shown), such as an end-user meter or smart device, on the customer site. The customer demand response system is configured to selectively reduce or disconnect customer loads at the customer site in response to customer shedding request 485.

For example, shedding request 480 may be generated based on whether the switches in plan 430 have sufficient capacity to supply the forecasted load and/or whether alternate sources 455 in plan 430 have sufficient power for maximum loads in de-energized zones 445. More particularly, shedding request 480 may indicate that shedding should occur in de-energized zone 445 and/or alternate source 455.

In the exemplary embodiment, FDIR system 405 includes a display 460. FDIR system 405 is configured to display, using display 490, a multi-dimensional visualization of de-energized zones 445, alternate source areas 455, and/or the switches connecting zones 445 and areas 455. For example, topology 435 may be displayed on top of a corresponding geographical map. De-energized zones 445 and/or alternate source areas 455 may be displayed on top of topology 435 and the geographic map. An operator of FDIR system 405 may use human interface device 470 to request that additional information from FDIR system 405 be displayed. For example, if the operator clicks on a displayed switch, display 490 may display the current capacity of the switch. As another example, if the operator clicks on a displayed zone, the current and/or forecasted load of the displayed zone may be displayed.

FDIR system 405 selectively transmits commands to the switches included in restoration plan 430. More particularly, in the sequence specified by plan 430, FDIR system 405 instructs the switches to change operative state (i.e., open, closed, on, off, etc.) according to plan 430. FDIR system 405 may communicate with the switches via controllers 101, 102, and/or 103. Alternatively, FDIR system 405 displays plan(s) 430 using display 490. More particularly, each step of plan 430 may be selectively displayed such that the operator may view the load flows, cascading effects, etc. of plan 430. For example, the operator may "play" plan 430 forward or backward to visualize each step. The operator may selectively execute one or more steps of plan 430 and/or one or more plans 430 using interface device 470.

To illustrate one possible operation of power restoration system 400, an example is given wherein a fault occurs at node 318 and switches 312, 323, and 337 are open. The fault is detected by fault detection engine 406 and communicated to isolation engine 407. Isolation engine 407 isolates the fault by opening switches 317, 319, and 321. Accordingly, zone 212 is effectively split into four zones: the isolated fault area including node 318, an area that can receive power from feeder 12, a blacked-out zone containing node 320, and a blacked-out zone containing 322. Restoration engine 425 may generate a plan 430 to restore power to node 322 by closing switch 323, thereby coupling node 322 with zone 222. Similarly, restoration engine 425 may generate a plan 430 to restore power to node 322 by changing switch states and/or generating demand response events or customer shedding requests.

As a further example, and continuing the above example, but wherein switch 323 is not closed because zone 222 is determined, e.g., by forecast system 415 and/or restoration engine 425, to have insufficient power to supply energy to node 322, restoration engine 425 may generate a plan 430 including one or more of the following, without limitation: open switch 326 to split zone 222, use demand response generation system 475 to lower the load in the split area of zone 222 that includes node 324 and to lower the load in zone 221, close switches 313 and 323 to couple nodes 322 and 324 with zone 221. The foregoing examples are meant to be illustrative only, and no limitation is intended thereby. However, it should be appreciated from the foregoing examples that restoration plans 430 may include more than just instructions to close a switch to supply power from one zone to a de-energized zone. Rather, zones may be reconfigured by restoration engine 425 and are not limited to pre-fault configurations.

Figure 3:
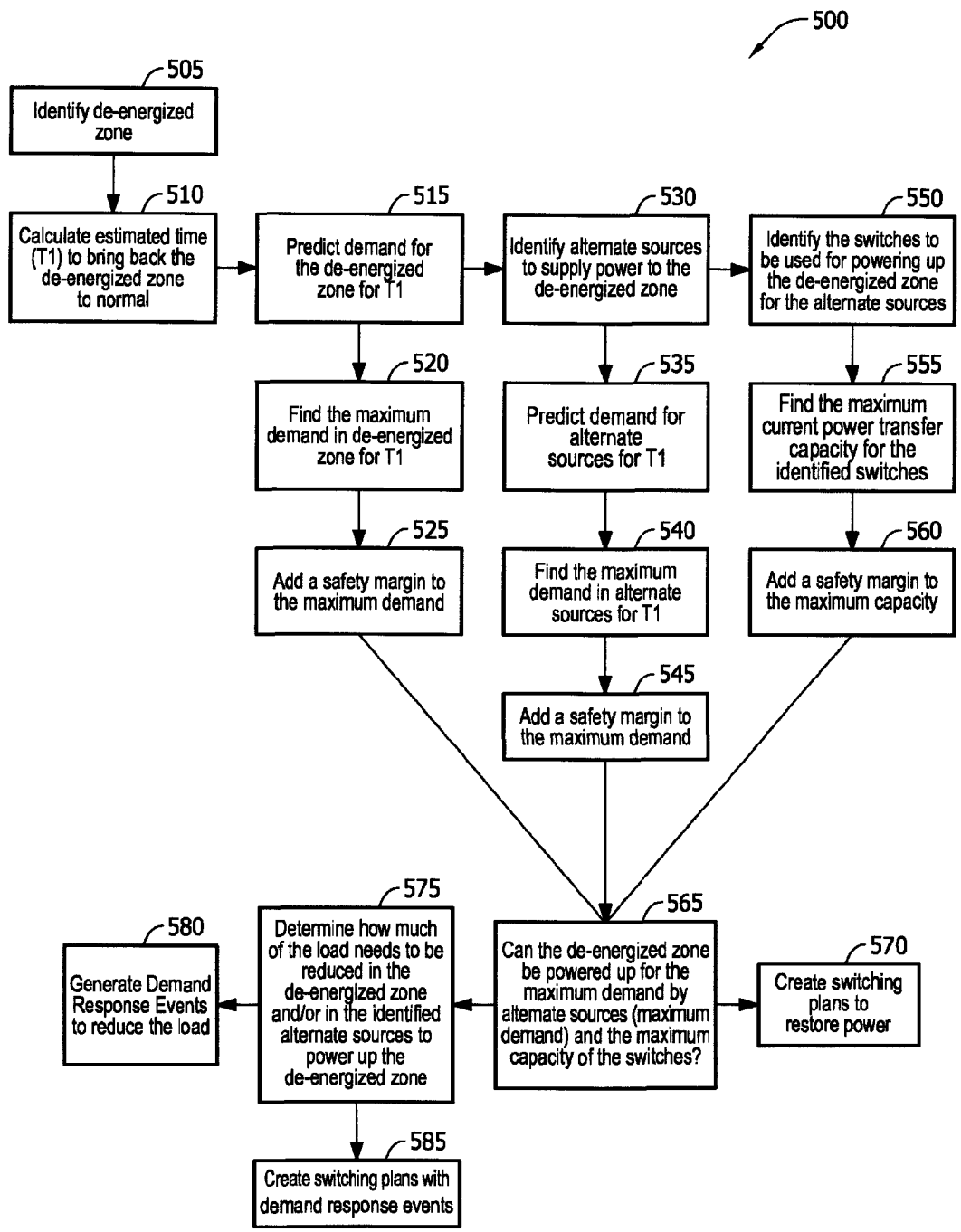
FIG. 3 is a flow chart that illustrates an exemplary method for using the power restoration system of FIG. 2.

FIG. 3 is a flow chart 500 illustrating an exemplary method for using power restoration system 400. In one embodiment, the steps of flowchart 500 may be embodied as computer-executable code stored on a computer-readable medium. Alternatively, or additionally, a processing device may be configured to execute the steps of flowchart 500. After a de-energized zone is identified 505, an estimated time T is calculated 510 for restoring power to the de-energized zone from the sources that supplied power to the de-energized zone before the fault or failure that de-energized the de-energized zone. In other words, time T is an estimate of the time required to restore the de-energized zone to normal. Time T may be calculated by system 400 or may be input to system 400 or FDIR system 405 by an operator.

A forecasted demand, or load, for the de-energized zone is generated 515 for time T, using, e.g., forecast system 415. The maximum forecasted demand for the de-energized zone during time T is identified 520. A safety margin is added 525 to the identified maximum forecasted demand. The safety margin may be a percentage, such as 5%, 10%, 15%, 20%, or 25% of the maximum forecasted demand, or a pre-determined number of watts and/or amps.

Alternative sources of power for the de-energized zone are identified 530 using, e.g., alternate source engine 450. A forecasted demand for each alternate source is generated 535 for time T using, e.g., forecast system 415. The maximum forecasted demand for each alternate source is identified 540. A safety margin is added 545 to the identified maximum forecasted demand for each alternate source.

The forecasted demands for de-energized zones and alternate sources may be based on current measurements, e.g., from real-time measurement system 440, on historical value projections, e.g., load changes by time of day, and/or on other issued configuration plans, e.g., during a storm, multiple faults may occur in different zones of network 100, and the restoration of one fault may effect the loads available to restore power in other zones. More than one forecast may be generated 515, 535 for time T, in which case, the maximum among all forecasts is identified 520 for de-energized zones and/or identified 540 for alternate sources.

The switches to be used for supplying power to the de-energized zone from each alternate source are identified 550. The maximum current power capacity for each identified switch is determined 555. In one embodiment, actual source capacities are calculated using a capacity check algorithm. FDIR system 405 may communicate with real-time measurement system 440 and/or controllers 101, 102, and/or 103 to acquire actual source capacity limits of the identified switches. More particularly, system 400, using FDIR system 405, may determine actual source capacity limits by analyzing real-time measurements using, for example, power flow and contingency analysis. Using such real-time measurements, system 400 may predict the actual capacity limit for each identified switch for time T or some other time period. In another embodiment, the rated maximum capacity of each identified switch is used rather than a measured or calculated capacity. A safety margin is added 560 to the maximum capacity of each identified switch. For example, the maximum capacity may be reduced by a percentage of the actual or rated maximum capacity.

Power restoration system 400 determines 565, e.g., using restoration engine 425 and/or FDIR system 405, whether the maximum demand of the de-energized zone can be supplied by the identified alternate sources based on the maximum demand of each alternate source and the maximum capacity of each identified switch. If the maximum demand of the de-energized zone can be supplied, then a restoration plan is generated 570. The restoration plan includes the identified switches that must be opened or closed to supply power to the de-energized zone from one or more of the alternate sources, and the order in which the switches are to be switched. The selection of alternate sources, switches, and switching order facilitate reducing the risk of cascading power failures during the powering up of the de-energized zone. If power restoration system 400 attempts to use an alternate source to supply more load than the alternate source can supply, network 100 may suffer from sagging voltages, which may further trigger voltage collapse, or power flow infeasibility. Such a condition may be communicated back to restoration engine 425 from real-time measurement system 440 for use in generating new plans.

If, however, the alternate sources or identified switches are unable to meet the maximum forecasted demand of the de-energized zone, power restoration system 400 may determine 575 an amount of load that needs to be reduced in the de-energized zone and/or the alternate sources in order to meet the maximum forecasted demand of the de-energized zone. Based on the determined amount of load to be reduced, a shedding request, e.g., shedding request 480, is generated 580. The shedding request may be transmitted to customer sites, e.g., via demand response system 475, to reduce loads in the de-energized zone and/or the alternate sources. A switching plan is generated 585 based on forecasted demands that are reduced by the shedding request. More particularly, the switching plan may include a schedule that coordinates the timing of shedding requests sent to customer sites with switching operations.

The methods and systems described herein provide an efficient and cost-effective means for restoring power to power distribution networks. The disclosed system generates restoration plans that have higher probabilities of being successfully executed and that will require fewer future reconfigurations, thus requiring less operator intervention and minimizing the chances of restoration plans having to be recalculated. Results may include faster restoration times, fewer penalties to utility companies, and optimized reconfiguration of the distribution network.

The term processing device, as used herein, refers to central processing units, microprocessors, microcontrollers, reduced instruction set circuits (RISC), application specific integrated circuits (ASIC), logic circuits, and any other circuit, processor, and/or computer capable of executing the functions described herein.

As used herein, the terms "software" and "firmware" are interchangeable, and include any computer program stored in memory for execution, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is for a method for restoring power based on forecasted loads. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for use in restoring power to a power distribution network, said system comprising:
    a forecast system configured to generate forecast information about the power distribution network; and
    a fault detection, isolation, and recovery (FDIR) system coupled to the power distribution network, said FDIR system including a processor in communication with a memory, said FDIR system configured to:
    generate fault information about at least one zone in the power distribution network;
    receive forecast information from said forecast system;
    identify at least one alternate source of power for the at least one zone; and
    generate a restoration plan based on the fault information and the forecast information, wherein the restoration plan includes a listing of a collection of switches for powering up the at least one zone by the at least one alternate source of power, a first safety margin based on a maximum demand for the at least one zone, a second safety margin based on a maximum demand for the at least one alternate source of power, and a third safety margin based on a maximum current power transfer capacity for the collection of switches; and
    determine whether the at least one zone can be powered up as a result of applying the first safety margin, the second safety margin, and the third safety margin to the restoration plan.

2. A system in accordance with claim 1, further comprising a demand response system coupled to said FDIR system, said FDIR system further configured to transmit a shedding request to said demand response system.

3. A system in accordance with claim 2, wherein said demand response system is configured to transmit at least one customer shedding request to at least one customer site based on the shedding request, wherein the customer shedding request is capable of reducing a customer load.

4. A system in accordance with claim 3, wherein said FDIR system is further configured to generate the shedding request based on the forecast information.

5. A system in accordance with claim 1, further comprising a display coupled to said FDIR system, said display is configured to display the zone, the power distribution network, and a geographical map.

6. A system in accordance with claim 1, wherein said forecast system is further configured to generate forecast information about the power distribution network using historical usage information.

7. A system in accordance with claim 1, wherein the restoration plan further includes a pre-determined sequence for flipping each of the collection of switches in the power distribution network.

8. A fault detection, isolation, and recovery (FDIR) system for use with a power restoration system coupled to a power distribution network, the FDIR system including a processor in communication with a memory, the FDIR system configured to:
   generate fault information about at least one zone in the power distribution network;
   receive forecast information about the power distribution system;
   identify at least one alternate source of power for the at least one zone;
   generate a restoration plan based on the fault information and the forecast information, wherein the restoration plan includes a listing of a collection of switches for powering up the at least one zone by the at least one alternate source of power, a first safety margin based on a maximum demand for the at least one zone, a second safety margin based on a maximum demand for the at least one alternate source of power, and a third safety margin based on a maximum current power transfer capacity for the collection of switches; and
   determine whether the at least one zone can be powered up as a result of applying the first safety margin, the second safety margin, and the third safety margin to the restoration plan.

9. A FDIR system in accordance with claim 8, wherein said control FDIR is further configured to transmit a shedding request to a demand response system.

10. A FDIR system in accordance with claim 9, wherein the demand response system is configured to transmit at least one customer shedding request to at least one customer site based on the shedding request, wherein the customer shedding request is capable of reducing a customer load.

11. A FDIR system in accordance with claim 10, wherein said FDIR system is further configured to generate the shedding request based on the forecast information.

12. A FDIR system in accordance with claim 8, further comprising a display, said display configured to display the zone, the power distribution network, and a geographical map.

13. A FDIR system in accordance with claim 8, wherein the forecast information is based on historical usage information.

14. A FDIR system in accordance with claim 8, wherein the restoration plan further includes a pre-determined sequence for flipping each of the collection of switches in the power distribution network.

15. A method for restoring power to a power distribution network, said method implemented using a fault detection, isolation, and recovery (FDIR) system including a processor in communication with a memory, said method comprising:
   identifying at least one zone within the power distribution network;
   predicting a first energy demand of the at least one zone;
   identifying at least one alternate source of power for the at least one zone;
   identifying at least one switch within the power distribution network capable of supplying power from the at least one alternate source to the at least one zone;
   generating a restoration plan for restoring power to the at least one zone, wherein the restoration plan includes a first safety margin based on a maximum demand for the at least one zone, a second safety margin based on a maximum current power transfer capacity for the at least one switch, and a third safety margin based on a maximum current power transfer capacity for the collection of switches; and
   determining whether the at least one zone can be powered up as a result of applying the first safety margin, the second safety margin, and the third safety margin to the restoration plan.

16. A method in accordance with claim 15, further comprising determining whether the energy demand of the at least one zone is greater than a maximum current power transfer capacity of the at least one switch.

17. A method in accordance with claim 16, further comprising generating a shedding request if the energy demand of the at least one zone is greater than a maximum current power transfer capacity of the at least one switch.

18. A method in accordance with claim 15, further comprising predicting a second energy demand of the at least one alternate source.

19. A method in accordance with claim 15, further comprising determining whether the restoration plan can be powered up for the maximum demand for the at least one zone, the maximum demand for the at least one alternate source of power, and the maximum current power transfer capacity.

20. A method in accordance with claim 15, wherein the restoration plan further includes a fourth safety margin based on a maximum demand for the at least one alternate source of power.

* * * * *